United States Patent
Dang et al.

(10) Patent No.: US 11,082,289 B2
(45) Date of Patent: Aug. 3, 2021

(54) ALERT INTELLIGENCE INTEGRATION

(71) Applicant: ServiceNow, Inc., Santa Clara, CA (US)

(72) Inventors: Kanwaldeep Kaur Dang, Sammamish, WA (US); Ritika Goyal, Seattle, WA (US); Luc John Johnson, Bothell, WA (US); Bnayahu Makovsky, Savyon (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/402,896

(22) Filed: May 3, 2019

(65) Prior Publication Data
US 2020/0351151 A1 Nov. 5, 2020

(51) Int. Cl.
*G06F 15/173* (2006.01)
*H04L 12/24* (2006.01)
*G06N 20/00* (2019.01)

(52) U.S. Cl.
CPC ......... *H04L 41/0686* (2013.01); *G06N 20/00* (2019.01); *H04L 41/0869* (2013.01); *H04L 41/16* (2013.01)

(58) Field of Classification Search
CPC . H04L 41/0686; H04L 41/16; H04L 41/0869; G06N 20/00
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |

(Continued)

*Primary Examiner* — Padma Mundur
(74) *Attorney, Agent, or Firm* — Fletcher Yoder PC (57) ABSTRACT

An enterprise platform may include a time series database that may include time series data related to a plurality of configuration items associated with an enterprise. The enterprise platform may also include one or more instance data tables having instance data associated with the plurality of configuration items. The enterprise platform may also include an alert interface that may receive an indication of an alert associated with a configuration item of the plurality of configuration items and determine a subset of a plurality of metrics associated with the alert based on the configuration item and the time series data, the instance data, or both. The alert interface may then generate a plurality of visualizations for display via a user interface based on the subset of the plurality of metrics.

20 Claims, 7 Drawing Sheets

(56) References Cited

U.S. PATENT DOCUMENTS

| | | |
|---|---|---|
| 7,769,718 B2 | 8/2010 | Murley |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 2015/0156213 A1* | 6/2015 | Baker ................ H04L 63/1416 726/23 |
| 2017/0147417 A1* | 5/2017 | Sasturkar ............ G06F 11/0709 |
| 2019/0058639 A1* | 2/2019 | Rangavajhala ....... G06F 11/327 |
| 2020/0133814 A1* | 4/2020 | Prabath ............... G06F 16/2228 |

\* cited by examiner

ALERT0034444

TOP PRIORITY [2] ↻
LAST REFRESHED 3M AGO

| ALERT NUMBER | GROUP | GROUP | SEVERITY | PRIORITY GROUP | STATE | CONFIGURATION ITEM |
|---|---|---|---|---|---|---|
| ALERT0010002 | NONE | THE FOLLOWING DISTRIBUTED CLUST... | ○ MAJOR | ○ HIGH | OPEN | (EMPTY) |
| ALERT0010132 | NONE | THE FOLLOWING CONNECTOR INSTAN... | ○ MAJOR | ○ HIGH | OPEN | (EMPTY) |

162 ⎫ (bracketing the two ALERT rows)

ALERT0034444

DETAILS

THE FOLLOWING DISTRIBUTED CLUSTERS ARE IN THE FOLLOWING STATES: CLUSTER: MID OI CLUSTER STAT....
⊙ UPDATED 03:12:42 2018-01-25   SOURCE EMSELF MONITORING
  CI CLASS WINDOW SERVER   ROLE IN GROUP NONE   GROUP NONE

— 172
— 174
— 170

ALERT

| PRIORITY HIGH | NODE: SECURITY ○ MAJOR | | ACTIONS ▽ |
|---|---|---|---|

METRICS   INSIGHT — 178

TASK: N/A   ACTIONS 176

DTAILS   IMPACTED SERVICES   SECONDARY ALERTS   EVENTS   ALERT EXECUTIONS   REMEDIATION TASKS

ALERT

| NUMBER ALERT0010002 | STATE CLOSED | ◁ | 2018-11-28 10:45  2018-11-28 10:50  2018-11-28 10:55  2018-11-28 11 |
| CONFIGURATION ITEM Wins-2019-G78JES6 | NODE | ▷ | ACTIVITY |
| CLASS | | | RESPOND TO THIS RECORD VIA WORK NOTES ▽ |
| RESOURCE MID CLUSTER HEALTH MONITOR | TASK | ◁ | TYPE COMMENT OR ATTACH SOLUTION |
| TYPE SELFMONITORING △ | PARENT | ◁ | |
| MESSAGE KEY 54a4ba965305230099 8dddeeff7b12d6 | LOCATION | | |

ALERT INTELLIGENCE INTEGRATION

BACKGROUND

The present disclosure relates generally to metric exploration on computer networks. More particularly, the present disclosure relates to an architecture for facilitating exploration of metric data for alerts that may relate to the operation of configuration items or the like that are present on the computer network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

Data regarding items on a communications network may be monitored and presented via an electronic display using a variety of types of visualizations, to assess network health. In some cases time series data may be retained, analyzed, and visualized. Unfortunately, however, due the vast number of devices on a network and the vast amount of data available for these devices, it is oftentimes difficult to view data that may be relevant to information sought after by a user.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized widgets to be generated for such data, enabling a visualization of certain indicators for the data for rapid and/or real-time monitoring of the data.

In some embodiments of the current disclosure, a user interface may be provided for presenting key performance indicators (KPIs) for configuration items in a network. The user interface may include a dashboard or collection of visualizations that represent a select number of indicators associated with certain configuration items. The configuration items (CIs) may include any computer, device, software, or service executing in a configuration management database (CMDB). As such, the dashboard may present visualizations related to certain operating characteristics of various configuration items that may be part of a network.

By way of example, the user interface may present visualizations of 8-10 data fields that are identified or determined to be correlated to an alert provided by a management system. The alert may provide an indication that one or more configuration items is executing above or below some threshold that distinguishes between a normal operating zone and a boundary or potentially problematic operating zone.

The visualizations presented via the user interface may include single score (e.g., average, minimum, maximum, mean) values for a particular data field associated with a particular configuration item and associated with the generated alert. That is, the visualizations may provide data with context to a time window or a range of time that corresponds to a time at which the alert was received. Based on the time window, some of the visualizations may include line chart visualizations for a particular data field, such that the line chart visualizations depicts data for the period of time that corresponds to the time window associated with the alert. In some embodiments, the line chart visualizations may also include additional plots on the line graph that represents bounds (e.g., upper bounds, lower bounds, both) that correspond to desired operating parameters as determined by modeling software that analyzes the real time performance data output by the various configuration items. The models generated by the modeling software, in some embodiments, may be generated periodically (e.g., daily) for each configuration item with respect to each data field being presented as a visualization on the user interface.

In some cases, the visualizations that are presented with the user interface for each configuration item and each alert may be defined by an authorized user (e.g., administrator). That is, the authorized user may predefine in metadata associated with an alert, a configuration item, or the like a number of variables or data fields that is to be presented via visualizations using the user interface in response to the alert being populated. In some embodiments, the type (e.g., value, single score value, line chart, bar graph) of visualization presented for each data field may be defined in the metadata as well.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB.

Current embodiments relate to an Alert Intelligence Integration tool, which may enable users to explore a subset of the available metric data related to an alert generated for one or more configuration items of a computer network. More specifically, the present embodiments provide the subset of metrics via a collection of visualizations presented via a graphical user interface that generates the visualization. For added functionality, the Alert Intelligence Integration tool may monitor the visualizations chosen by a user to be generated for each type of alert and use these selections to identify the subset of visualizations to generate in response to receiving an indication of an alert for a configuration item in the monitored computer network of configuration items.

Figure 1:
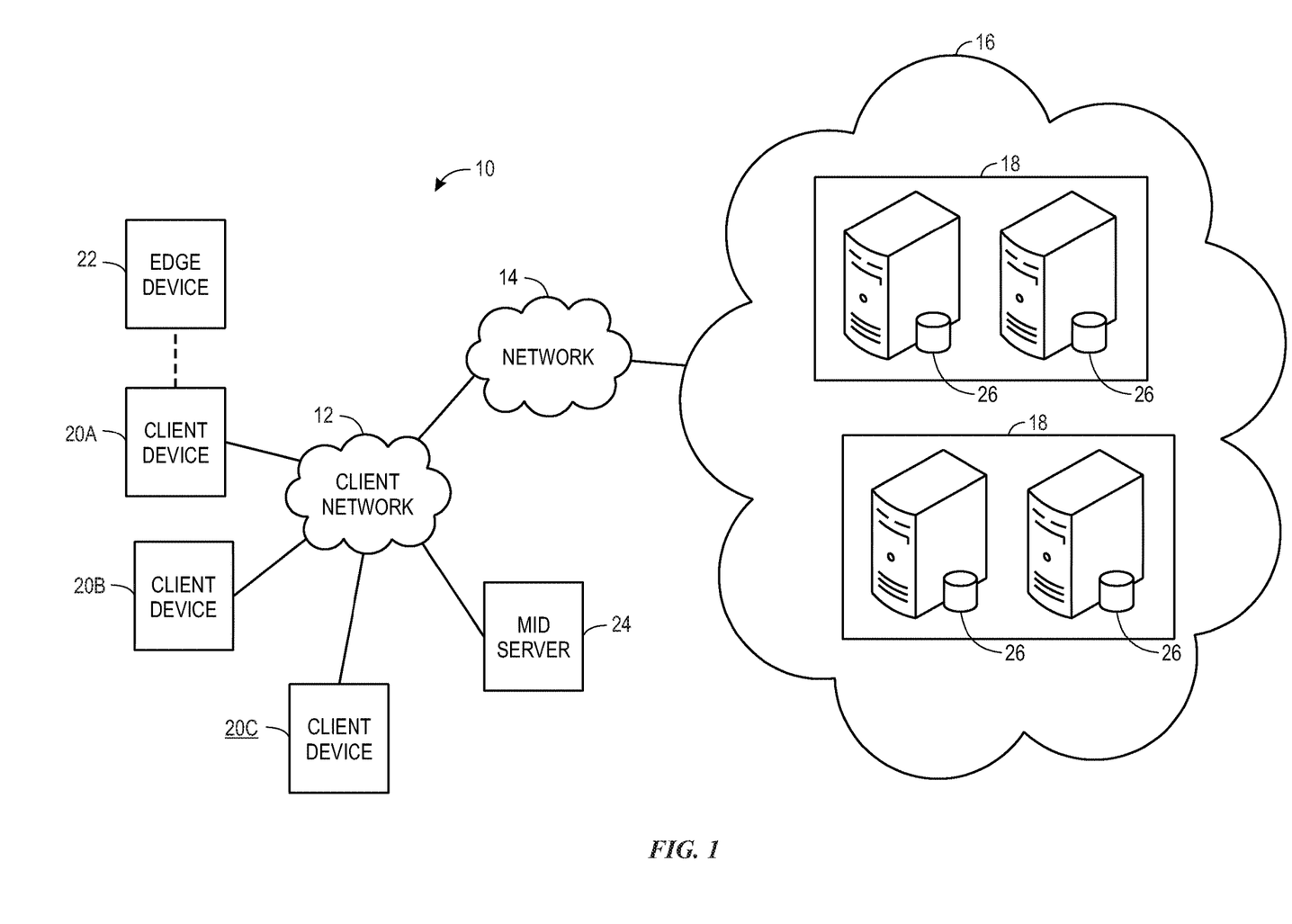
FIG. 1 is a block diagram of an embodiment of a multi-instance cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
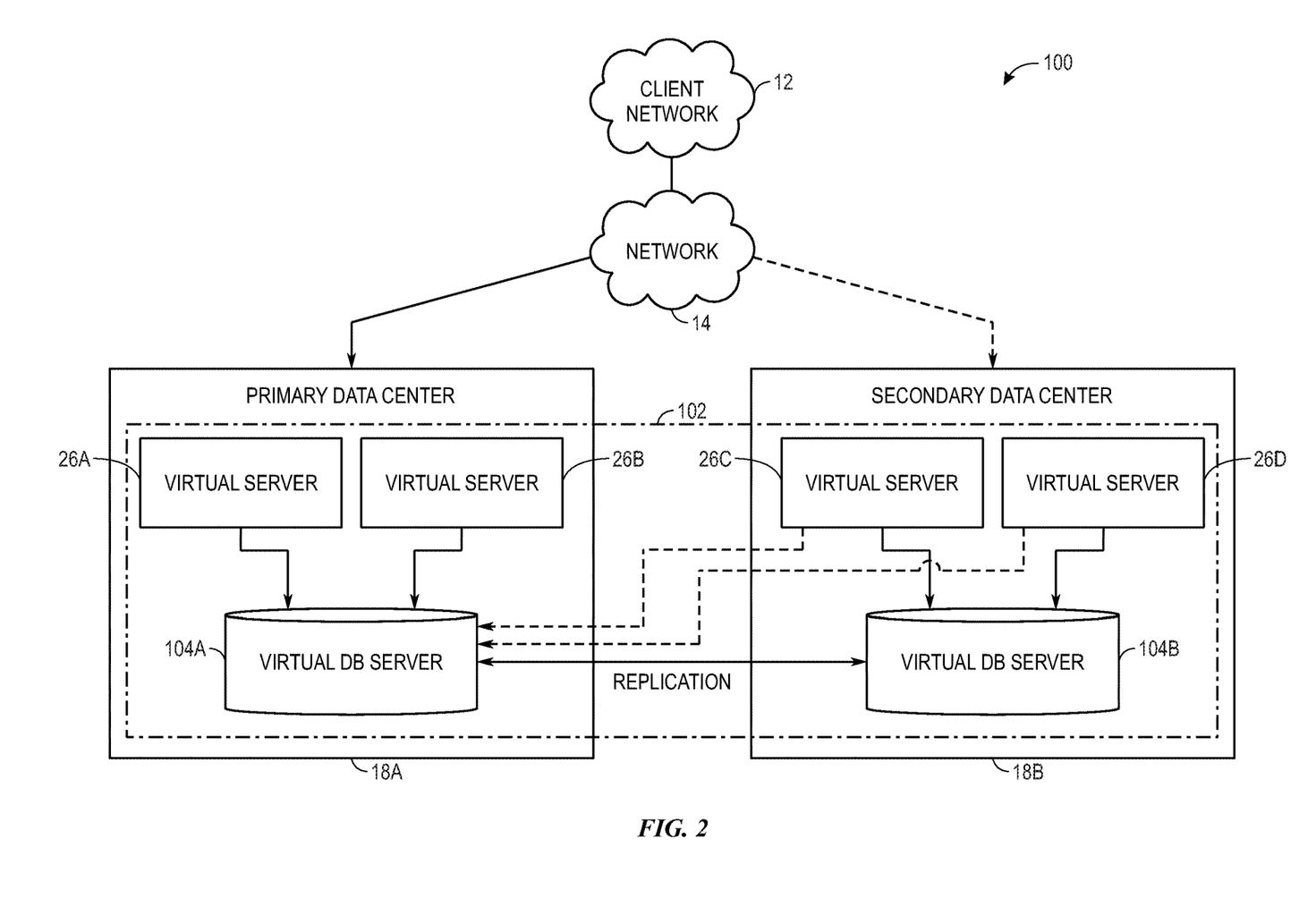
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 26A, 26B, 26C, and 26D) and dedicated database servers (e.g., virtual database servers 44A and 44B). Stated another way, the virtual servers 26A-26D and virtual database servers 44A and 44B are not shared with other client instances and are specific to the respective client instance 42. In the depicted example, to facilitate availability of the client instance 42, the virtual servers 26A-26D and virtual database servers 44A and 44B are allocated to two different data centers 18A and 18B so that one of the data centers 18 acts as a backup data center. Other embodiments of the multi-instance cloud architecture 100 could include other types of dedicated virtual servers, such as a web server. For example, the client instance 42 could be associated with (e.g., supported and enabled by) the dedicated virtual servers 26A-26D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 44A, 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
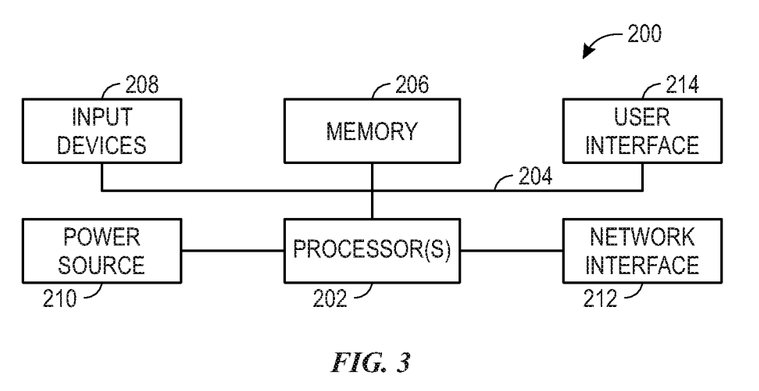
FIG. 3 is a block diagram of a computing device utilized in a cloud computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
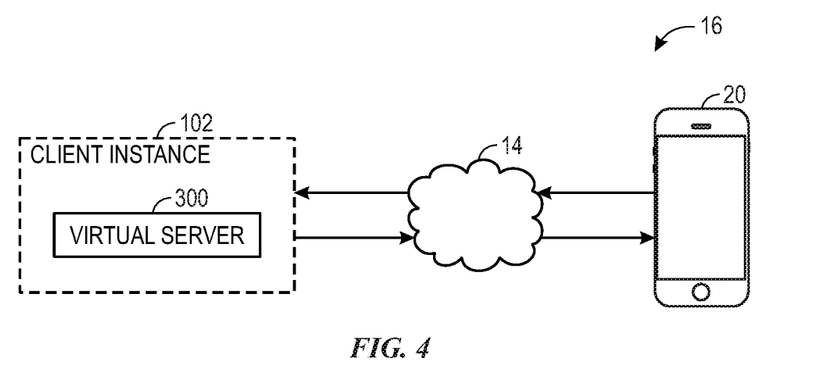
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 96 supports and enables the client instance 42, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 42 (e.g., via a web browser of the client device 20D). Client instance 42 is supported by virtual servers 26 similar to those explained with respect to FIG. 2, and is illustrated here to show support for the disclosed functionality described herein within the client instance 42. Cloud provider infrastructures are generally configured to support a plurality of end-user devices, such as client device 20D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

Figure 5:
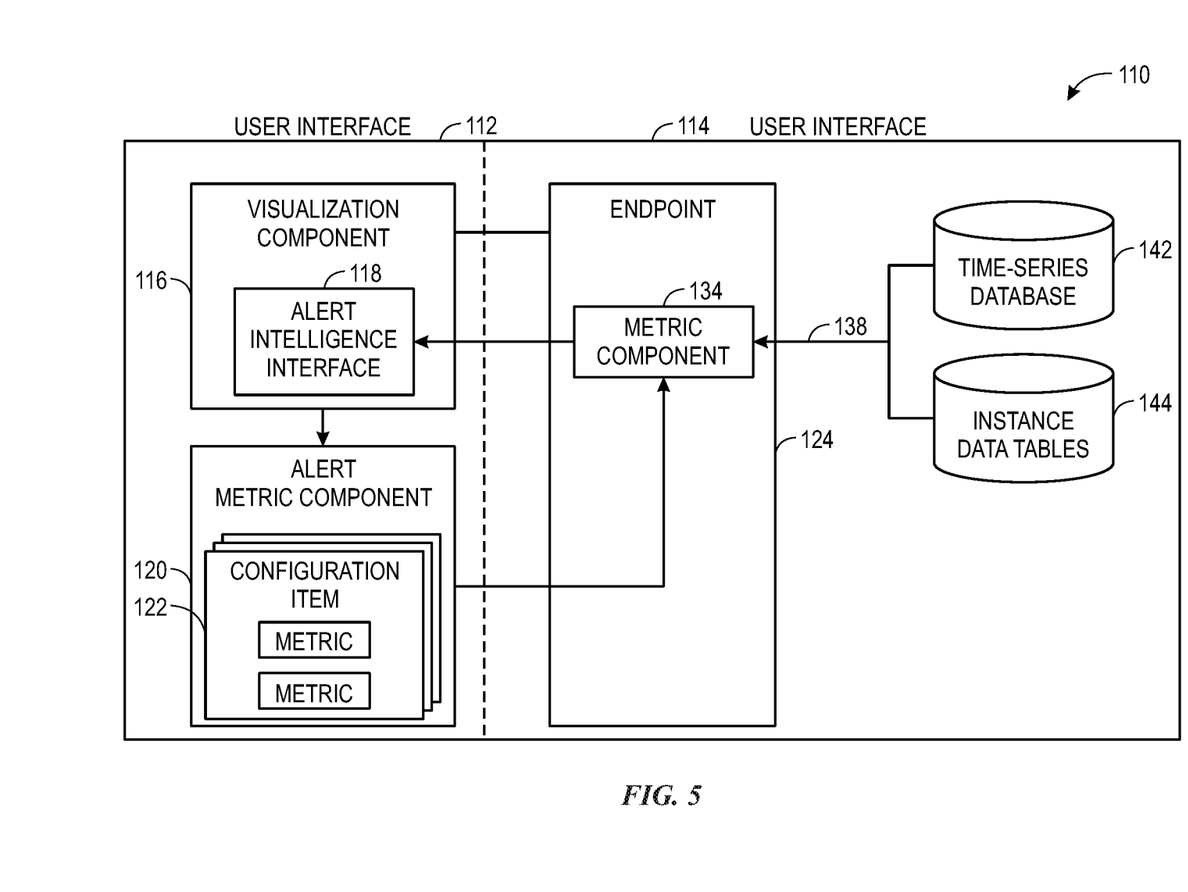
FIG. 5 is a block diagram illustrating an architecture used to implement the Alert Intelligence Integration tool, in accordance with aspects of the present disclosure.

FIG. 5 is a block diagram illustrating an architecture 110 used to implement the Alert Intelligence Integration tool, in accordance with aspects of the present disclosure. As illustrated, a user interface component 112 may be communicatively coupled with the platform 114 to provide the Alert Intelligence Integration tool functionality described herein. In particular, a visualization component 116 of the user interface component 112 may provide an alert intelligence interface 118, which may present visualizations related to alerts that have been generated regarding a configuration item or other item that may be computing system 10 or other suitable systems.

As mentioned above, the configuration items may include any computer, device, software, service executing in a configuration management database (CMDB), or other software or hardware component present in the computing system 10, the multi-instance cloud architecture 40, or the like. By way of example, the configuration items may include servers, databases, load balancers, virtual machines, and the like.

In some embodiments, the alert intelligence interface 118 may be part of a visualization component 116 that generates visualizations for the computing system 80 or the like. The alert intelligence interface 118 may interact with the alert metric component 120 to generate a dashboard visualization for each alert that may be populated for a respective configuration item. By way of example, the alert metric component 120 receive an indication that an alert has been generated for a configuration item. The alert may correspond to a condition being present for a configuration item. The condition may correspond to a property (e.g., value) that is associated with the configuration item being above a threshold, below a threshold, or the like. The alert is generated to provide a user of the computing system 80 an indication related to the operations of the respective configuration item.

In computer network systems, the ability to alert and inform users of conditions that are present in the computing system 10 or the like assist the user to trouble shoot and resolve problems that may affect the ability of the computing system 10 to perform its respective operations. As such, the timeliness of the alert provided to the user interface 112 directly impacts the user's efficiency in resolving any issues to ensure that the configuration items are operating according to the desired parameters.

As shown in FIG. 5, the alert metric component 120 may include a list of configuration items 122, which may be stored in a memory, a storage, metadata, or the like. Each listed configuration item 122 may define one or more metrics as dashboard metrics to be generated in the dashboard visualization discussed above. As such, each respective configuration item 122 may be associated with one or more metrics that the alert intelligence interface 118 may use to generate the respective dashboard visualization.

In some embodiments, the configuration item itself may include metadata that defines the metrics to be generated in the dashboard visualization. That is, after receiving an indication of an alert, the alert intelligence interface 118 may access the configuration item to determine whether metadata associated with the respective configuration item includes predefined metrics.

In some embodiments, the metrics defined in the listed configuration item 122 may be predefined by a user having a certain authority level within the computing system 10. The defined metrics may correspond to the key performance indicators (KPIs) for an alert generated for the respective configuration item 122. As such, by way of operation, the alert intelligence interface 118 may receive an indication of an alert condition being present for a configuration item from a monitoring system, the computing system 80, another configuration item, or the like.

After receiving the indication of the alert, the alert intelligence interface 118 may identify a configuration item that is related to the alert. Based on the configuration item, the alert intelligence interface 118 may query the alert metric component 120 to determine the metrics that have been defined for the dashboard visualization. In some embodiments, the alert metric component 120 may receive information regarding the configuration item from the alert intelligence interface 118 and may send an indication of the defined metrics for the respective configuration item 122 to a metric component 134 of an endpoint 124 in the platform 114.

The platform 114 may include an endpoint 124 (e.g., a representational state transfer (REST) endpoint). As may be appreciated, the endpoint 124 may accept requests from the user interface 112 and provide results to user interface 112 based upon those requests.

As illustrated in FIG. 5, the endpoint 124 may receive the defined metrics regarding the configuration items 122 and retrieve the respective metrics from a time-series database 142 and/or instance data tables 144. As may be appreciated, a time-series database is a special purpose database that is optimized for time-stamped or time series data. Time series are metrics tracked and aggregated over time. The instance data tables 144 provide metric data for a particular instance of services for a particular enterprise.

Using the time-series database 142 and the instance data tables 144, the metric component 138 may acquire the requested metrics that may be used to generate visualizations by the alert intelligence interface 118. As such, the metrics that are defined in the configuration items 122 may provide some indication related to a type (e.g., instance, time series) of data that may be retrieved from any suitable data source. Although FIG. 5 illustrates the time-series database 142 and the instance data tables 144, it should be noted that the data related to the defined metrics may be acquired from any suitable data source and should not be limited to the embodiments described herein. In addition, although the alert intelligence interface 118 is illustrated as operating with the platform 114 illustrated in FIG. 5, the alert intelligence interface 118 may operate in a variety of embodiments to acquire the data related to the metrics defined for the respective configuration items 122. That is, for example, the alert intelligence interface 118 may have access to the predefined metrics for each configuration item 122 via a local storage or memory component, instead of via the alert metric component 120. In the same manner, various aspects regarding how the alert intelligence interface 118 retrieves the data for the dashboard visualization described below may be implemented in a variety of ways.

Figure 6:
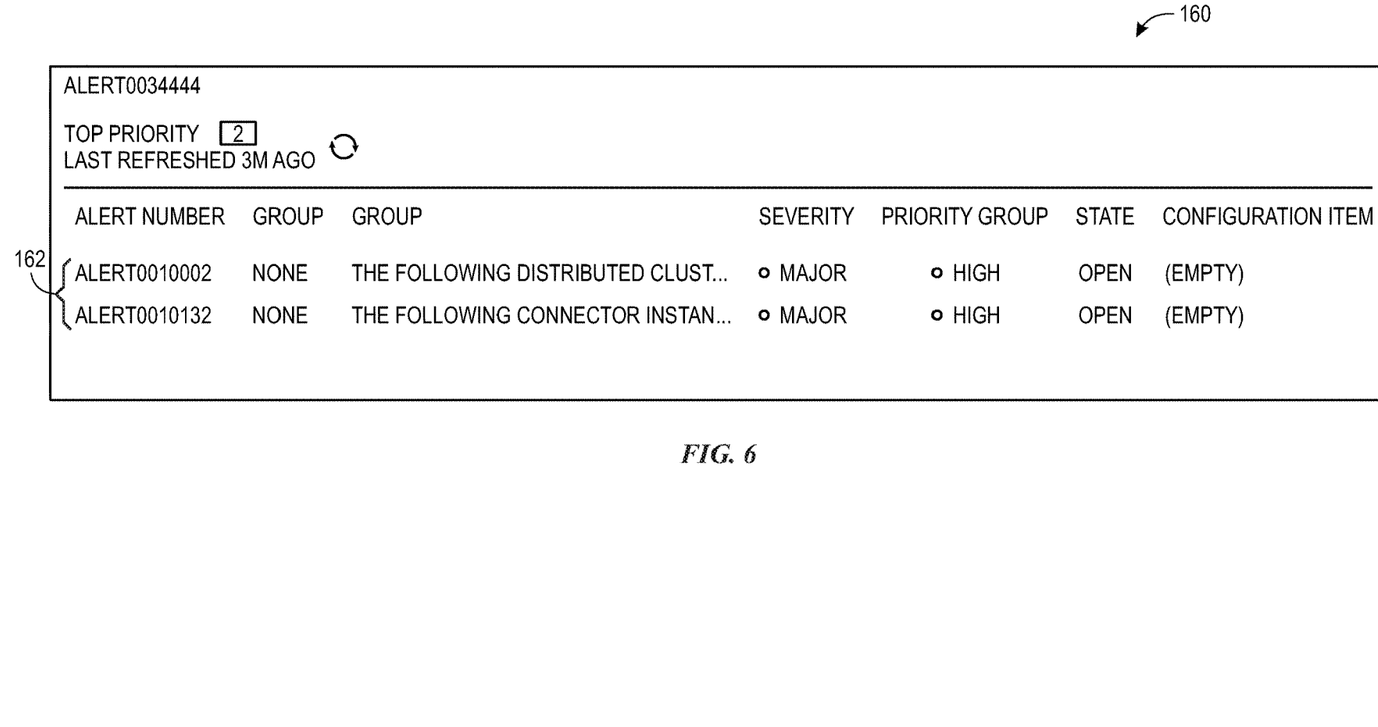
FIG. 6 is a schematic diagram illustrating a main menu screen of the Alert Intelligence Integration tool, in accordance with aspects of the present disclosure.

Having discussed the basic architecture of the alert intelligence interface 118, the discussion now turns to a more detailed discussion of visualizations and interactions with the alert intelligence interface 118. FIG. 6 is a schematic diagram illustrating an example main menu screen 160 for the alert intelligence interface 118, in accordance with aspects of the present disclosure. As illustrated, the main menu 160 may provide a list 162 of alerts that may be present on the computer system 10 or the like.

The list 162 of alerts may be include additional information, such as alert number, group, description, severity level, priority group, state, related configuration item, and the like. After receiving an input representative of a selection of one of the alerts in the list 162 of the alerts from a user from the user interface 112, the alert intelligence interface 118 may generate a visualization 170 (FIG. 7) that provides additional information regarding the respective alert.

Figure 7:
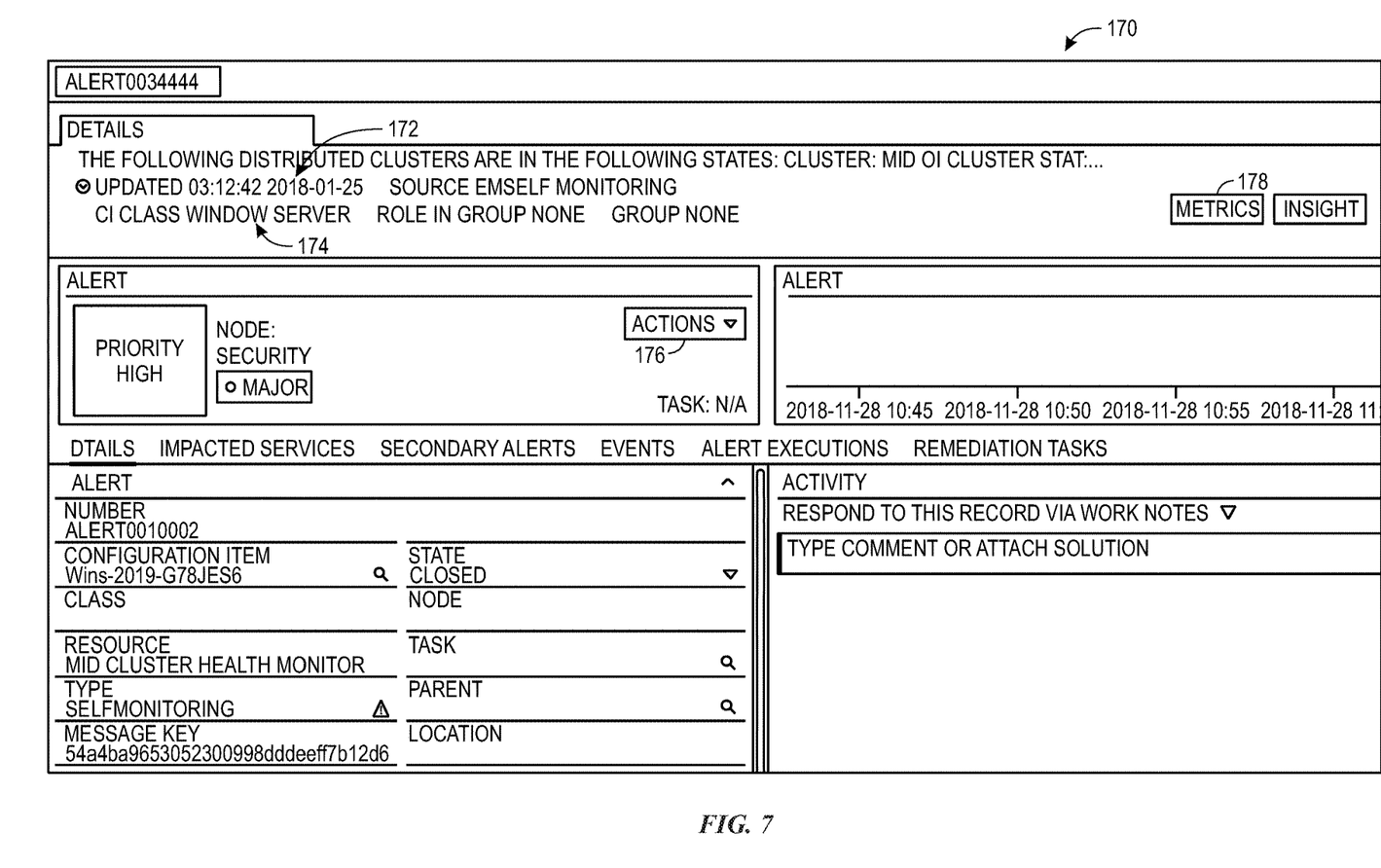
FIG. 7 is a schematic diagram illustrating details related to an alert presented in the Alert Intelligence Integration tool, in accordance with aspects of the present disclosure.

As shown in FIG. 7, the visualization 170 may provide more detailed data regarding the respective alert. By way of example, the visualization may indicate a time field 172 that indicates a date and time in which the alert was updated, a configuration item class field 174 that indicates a type of configuration item that corresponds to the alert. The visualization 170 may also include an actions tab 176 that may provide options in which the user may perform to correct or address the issue that caused the alert to arise.

In addition the data presented in the visualization 170 mentioned above, additional information may be provided such as impacted services, secondary alerts, events, alert executions, remediation tasks, activity, and the like. As can be appreciated, the information provided in visualization 170 may cover a variety of different subjects and provide a plethora of data. In some instances, a user may be overwhelmed by the amount of data presented in the visualization 170. Additionally, when troubleshooting or trying to resolve an issue that caused the respective alert, the user may wish to view a certain subset of data that may be provided in the visualization 170 or that may be part of data that is not presented in the visualization 170.

With this in mind, the visualization 170 may include a metrics tab 178 that may cause the alert intelligence interface 118 to generate the dashboard visualizations that correspond to the subset of metrics defined in the configuration item 122 that corresponds to the respective alert. As such, after receiving an input via the metrics tab 178, the alert intelligence interface 118 may generate a collection of visualizations 180 as shown in FIG. 8.

Figure 8:
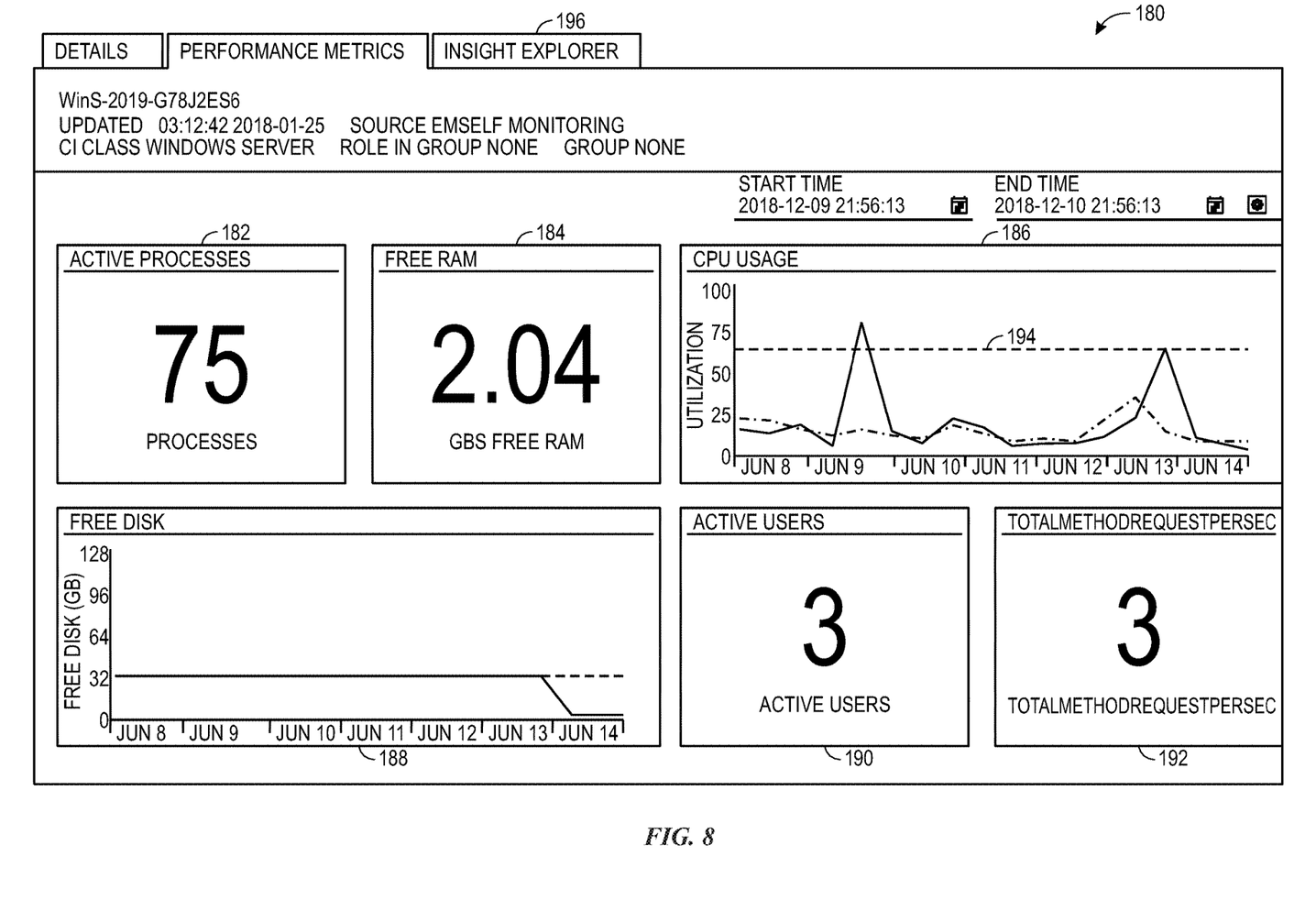
FIG. 8 is a schematic diagram illustrating a dashboard visualization of metrics related to the alert presented in the Alert Intelligence Integration tool, in accordance with aspects of the present disclosure.

Referring to FIG. 8, the collection of visualizations 180 may correspond to the metrics defined in the configuration item 122, as described above. That is, the alert intelligence interface 118 may retrieve the metrics defined for the configuration item 122 that corresponds to the configuration item related to the respective alert from the metric component 134 or the like. By way of example, the collection of visualizations 180 may include an active processes field 182, a free random-access memory (RAM) field 184, a central processing unit (CPU) usage graph 186, a free disk graph 188, an active users field 190, a total method requests per second field. 192, and the like. As shown in FIG. 8, the collection of visualizations 180 may include data value fields (e.g., active users field 190, free RAM field 184) that provide single data values for the corresponding field. In some embodiments, each data value field may retrieve instantaneous data values that correspond to a time at which the alert was generated from the instance data tables 144 or some other database. The type of data populated in the respective data field may be specified as part of the defined metrics in the respective configuration item 122. In some embodiments, each of the collection of visualizations 180 may be modified to present a different type of data. For example, each data field may be configurable to display an aggregate data value, an average value, a peak value, a minimum value, and the like based on user input receive via the user interface 112.

In any case, it should be noted that the collection of visualizations 180 is representative of data that corresponds to the time at which the alert was generated. In this way, the collection of visualizations 180 provides data in context to the generated alert. As a result, the user attempting to resolve the issue related to the respective alert may review information that has previously been identified as being correlated to the alert and configuration item combination. That is, in some embodiments, the defined metrics listed for each configuration item 122 may be selected with a respective alert, such that each configuration item and alert pair may refer to a select number of metrics that may best serve a user to troubleshoot the respective alert condition.

In addition to the data fields, the collection of visualizations 180 may include time series graphs (e.g., CPU usage graph 186, a free disk graph 188) that represents a collection of data over a period of time. The time series graphs may be generated based on data retrieved from the time-series database 142 or the like. The time series graphs may be generated to include an amount of time before and after the alert was generated. As such, the user may determine whether other conditions or issues may have been present to cause the condition related to the alert.

Like the data fields described above, the time series graphs may also be configurable to adjust the time period of the respective time series graph. As such, the user may retrieve additional time-series data based on the time period that the user wishes to view.

By presenting the collection of visualizations 180, the alert intelligence interface 118 may generate dashboard visualizations for the metrics defined in the configuration item 122 that corresponds to the selected alert. As such, the alert intelligence interface 118 provides an improved user interface for presenting KPIs for configuration items associated with an alert. Moreover, since the dashboard visualizations are generated based on a configuration item and alert pairing, the subset of data presented via the collection of visualizations 180 may correspond to the data fields and time series graphs that correlate to the underlying issue related to the alert.

Although the metrics defined in the configuration item 122 are described as being defined by a user with a certain authority level, in some embodiments, the metrics defined for each configuration item or for each configuration item and alert pair may be automatically selected or updated by some computing device or software. That is, for example, a machine learning module may monitor whether changes are made to the metrics defined by a user for each configuration item or for each configuration item/alert pair after the alert intelligence interface 118 generates the collection of visualizations 180. If the user selects a different time period or type of data, the machine learning module may monitor the changes and change the metrics stored in the configuration item 122 after a threshold number or percentage of users makes the respective change. As such, the alert intelligence interface 118 may leverage the aggregate use of each visualization of the collection of visualizations 180 to accommodate more users.

In some embodiments, each of the time series graphs presented in the collection of visualizations 180 may also provide an option to display bounds that correspond to an expected range of data for the respective data presented in the time series graph. The bounds may be generated based on a model built for the respective time-series data. That is, the alert intelligence interface 118 or some other modeling module may periodically (e.g., nightly, weekly, monthly) generate a model or update a model for the respective time-series data based on the metrics associated with the respective configuration item. As such, the model may be generated for the respective configuration item associated with the alert and for each metric defined in the configuration item 122. In addition, the alert intelligence interface 118 may build models for each configuration item with respect to each defined metric (e.g., per configuration item per metric). Using the model for the respective configuration item and metric, the alert intelligence interface 118 may add a bound to denote a data value that distinguishes between expected and unexpected operational ranges.

For instance, referring to the CPU usage graph 186 of FIG. 8, the user may provide a request to the alert intelligence interface 118 to add bound line 194, which may be generated based on the corresponding model generated for the configuration item with respect to the CPU usage metric. As a result, the user may interact with the collection of visualizations 180 to gain additional insight into the potential causes of the alert. In addition, if additional information is desired, the alert intelligence interface 118 may provide an insights explorer tab 196 to allow the user to retrieve additional information regarding the alert.

As may be appreciated, the techniques described herein provide an easy yet comprehensive mechanism for presenting relevant metric data related to an alert. The dashboard visualizations generated for each respective alert and configuration item pair assist users to quickly gather data that may assist the users to troubleshoot the underlying issue related to the alert. Further, the dashboard of visualizations provide a collection of data related to metrics within a single workspace to better allow the user to appreciate various details that provide proper context for the alert.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

We claim:

1. An enterprise platform, comprising:
   a time series database, comprising time series data related to a plurality of configuration items associated with an enterprise;
   one or more instance data tables comprising instance data associated with the plurality of configuration items, wherein the instance data comprises one or more instantaneous data values;
   a processor configured to access memory comprising computer-executable instructions configured to cause the processor to:
   receive an indication of an alert from a computing system in response to the computing system detecting an alert-triggering event being present in the plurality of configuration items;
   access the plurality of configuration items in response to receiving the indication of the alert-triggering event, wherein each of the plurality of configuration items comprises metadata relating to a respective set of metrics;
   determine a subset of a plurality of metrics based on the respective set of metrics associated with each of the plurality of configuration items, the time series data, the instance data, and the alert, wherein the subset of the plurality of metrics is predefined in a memory for a combination of the plurality of configuration items and the alert, and wherein the plurality of metrics includes a greater number of metrics as compared to the subset of the plurality of metrics;
   generate a plurality of visualizations for display via a user interface based on the subset of the plurality of metrics;
   receive one or more changes associated with the subset of the plurality of metrics;
   update the plurality of visualizations for display via the user interface based on the one or more changes to the subset of the plurality of metrics;
   determine whether the one or more changes to the subset of the plurality of metrics has been received more than a threshold amount of times by a plurality of users; and
   update the metadata corresponding to each configuration item in response to the one or more changes being received more than the threshold amount of times, wherein the metadata is updated based on the one or more changes to the subset of the plurality of metrics.

2. The enterprise platform of claim 1, wherein the plurality of metrics comprises a plurality of single data values and a plurality of time series graphs.

3. The enterprise platform of claim 1, wherein the plurality of visualizations comprises a time series graph representative of a collection of data over a period of time that corresponds to the alert.

4. The enterprise platform of claim 3, wherein the period of time that corresponds to the alert is adjustable via the user interface.

5. The enterprise platform of claim 1, wherein the processor is configured to periodically generate or update a model for at least one metric of the subset of the plurality of metrics.

6. The enterprise platform of claim 5, wherein the processor is configured to add a bound based on an expected range of data values for a period of time to a visualization of the plurality of visualizations based on the model.

7. A tangible, non-transitory, machine-readable medium, comprising machine-readable instructions that, when executed by one or more processors, cause the one or more processors to:
   receive an indication of an alert from a computing system in response to the computing system detecting an alert-triggering event being present in a plurality of configuration items;
   access the plurality of configuration items in response to receiving the indication of the alert-triggering event, wherein each of the plurality of configuration items comprises metadata relating to a respective set of metrics;
   determine a subset of a plurality of metrics based on the respective set of metrics associated with each of the plurality of configuration items, time series data related to the configuration item, instance data comprising one or more instantaneous data values associated with the plurality of configuration items, and the alert, wherein the subset of the plurality of metrics is predefined in a memory for a combination of the plurality of configuration items and the alert, and wherein the plurality of metrics includes a greater number of metrics as compared to the subset of the plurality of metrics;
   generate a plurality of visualizations for display via a user interface based on the subset of the plurality of metrics;
   receive one or more changes associated with the subset of the plurality of metrics;
   update the plurality of visualizations for display via the user interface based on the one or more changes to the subset of the plurality of metrics;
   determine whether the one or more changes to the subset of the plurality of metrics has been received more than a threshold amount of times by a plurality of users; and
   update the metadata corresponding to each configuration item in response to the one or more changes being received more than the threshold amount of times, wherein the metadata is updated based on the one or more changes to the subset of the plurality of metrics.

8. The machine-readable medium of claim 7, comprising machine-readable instructions that, when executed by the one or more processors, cause the one or more processors to:
   generate an additional visualization that depicts one or more details regarding the alert, wherein the additional visualization comprises a metrics tab; and determine the subset of the plurality of metrics in response to receiving an input at the metrics tab, wherein the input corresponds to the one or more changes to the subset of the plurality of metrics.

9. The machine-readable medium of claim 7, wherein the plurality of metrics comprises one or more single data values and one or more time series graphs.

10. The machine-readable medium of claim 7, comprising machine-readable instructions that, when executed by the one or more processors, cause the one or more processors to periodically generate or update a model for at least one metric of the subset of the plurality of metrics.

11. The machine-readable medium of claim 10, comprising machine-readable instructions that, when executed by the one or more processors, cause the one or more processors to receive one or more inputs configured to add a bound to a visualization of the plurality of visualizations based on the model.

12. A computer-implemented method, comprising:
receiving, via a processor, an indication of an alert from a computing system in response to the computing system detecting an alert-triggering event being present in a configuration item of a plurality of configuration items;
accessing the plurality of configuration items in response to receiving the indication of the alert-triggering event, wherein each of the plurality of configuration items comprises metadata relating to a respective set of metrics;
determining, via the processor, a subset of a plurality of metrics based on the respective set of metrics associated with each of the plurality of configuration items, time series data related to the configuration item, instance data comprising one or more instantaneous data values associated with the plurality of configuration items, and the alert, wherein the subset of the plurality of metrics is predefined in a memory for a combination of the configuration item and the alert, and wherein the plurality of metrics includes a greater number metrics as compared to the subset of the plurality of metrics;
generating, via the processor, a plurality of visualizations for display via a user interface based on the subset of the plurality of metrics;
receiving, via the processor, one or more changes associated with the subset of the plurality of metrics;
updating, via the processor, the plurality of visualizations for display via the user interface based on the one or more changes to the subset of the plurality of metrics;
determining, via the processor, whether the one or more changes to the subset of the plurality of metrics has been received more than a threshold amount of times by a plurality of users; and
updating, via the processor, the metadata corresponding to each configuration item in response to the one or more changes being received more than the threshold amount of times, wherein the metadata is updated based on the one or more changes to the subset of the plurality of metrics.

13. The computer-implemented method of claim 12, wherein the plurality of metrics comprises one or more single data values and one or more time series graphs.

14. The computer-implemented method of claim 12, wherein the subset of the plurality of metrics is predefined in metadata by an authorized user.

15. The computer-implemented method of claim 12, further comprising:
periodically generating or updating a model for at least one metric of the subset of the plurality of metrics; and
adding a bound to a visualization of the plurality of visualizations based on an expected range of data values for a period of time that corresponds to the alert and based on the model.

16. The enterprise platform of claim 1, wherein a visualization of the plurality of visualizations is generated for the combination of the configuration item and the alert.

17. The machine-readable medium of claim 7, wherein a machine learning module is configured to update the subset of the plurality of metrics based on a user change to the plurality of visualizations.

18. The enterprise platform of claim 1, wherein the subset of the plurality of metrics is predefined in metadata by an authorized user.

19. The machine-readable medium of claim 7, wherein the subset of the plurality of metrics is predefined in metadata by an authorized user.

20. The machine-readable medium of claim 7, wherein the plurality of visualizations for display via the user interface corresponds to a period of time determined for the alert.

* * * * *